(12) United States Patent
Gao et al.

(10) Patent No.: US 12,216,021 B2
(45) Date of Patent: Feb. 4, 2025

(54) SIMULATION DEVICE FOR MAGNETIC CLOSING OF FLAP VALVE

(71) Applicants: SHENZHEN UNIVERSITY, Shenzhen (CN); SICHUAN UNIVERSITY, Chengdu (CN)

(72) Inventors: Mingzhong Gao, Shenzhen (CN); Heping Xie, Shenzhen (CN); Guikang Liu, Shenzhen (CN); Ling Chen, Shenzhen (CN); Cong Li, Shenzhen (CN); Bo Yu, Shenzhen (CN); Xiangbiao Jiang, Shenzhen (CN); Yong Zhu, Shenzhen (CN); Chenghang Fu, Shenzhen (CN); Jianjun Hu, Shenzhen (CN); Nianhan Wu, Shenzhen (CN); Zhiqiang He, Shenzhen (CN); Mingqing Yang, Shenzhen (CN)

( * ) Notice: Subject to any disclaimer, the term of this patent is extended or adjusted under 35 U.S.C. 154(b) by 454 days.

(21) Appl. No.: 17/732,602

(22) Filed: Apr. 29, 2022

(65) Prior Publication Data

US 2022/0316981 A1 Oct. 6, 2022

Related U.S. Application Data

(63) Continuation of application No. PCT/CN2021/106705, filed on Jul. 16, 2021.

(30) Foreign Application Priority Data

Mar. 31, 2021 (CN) .......................... 202110351873.7

(51) Int. Cl.
*G01M 13/003* (2019.01)
*F16K 1/18* (2006.01)
*F16K 31/08* (2006.01)

(52) U.S. Cl.
CPC ......... *G01M 13/003* (2019.01); *F16K 31/084* (2013.01); *F16K 1/18* (2013.01)

(58) Field of Classification Search
CPC ...... G01M 13/003; F16K 31/084; F16K 1/18; G01N 1/08
See application file for complete search history.

(56) References Cited

U.S. PATENT DOCUMENTS 5,167,151 A * 12/1992 Hinant ...................... G01L 1/04
73/161

FOREIGN PATENT DOCUMENTS

CN 202317092 U 7/2012
CN 108279096 A * 7/2018 ............ G01M 3/224
(Continued)

*Primary Examiner* — Eric S. McCall
*Assistant Examiner* — Timothy P Graves (57) ABSTRACT

A simulation device for magnetic closing of flap valve is disclosed, which includes a worktable, a driving mechanism for driving the worktable to rotate, a valve seat, a magnetic valve cover movably connected with the valve seat, a first magnet for repelling the magnetic valve cover, a cylinder, a lifting equipment for driving the cylinder to rise and fall. When the cylinder is inserted into the valve seat driven by the lifting equipment, the cylinder prevents the closure of the magnetic valve cover. When the cylinder is out of contact with the magnetic valve cover driven by the lifting equipment, the magnetic valve cover is closed, and the worktable in the simulation device can rotate and turn over, so that the closing process of flap valve (valve seat and valve cover) in any direction of deep drilling coring under the action of magnetic force is simulated.

10 Claims, 5 Drawing Sheets

(56) References Cited

FOREIGN PATENT DOCUMENTS

| | | | |
|---|---|---|---|
| CN | 110441002 | A | 11/2019 |
| CN | 110847856 | A | 2/2020 |
| CN | 111577184 | A | 8/2020 |
| CN | 111911638 | A | 10/2020 |
| CN | 112444385 | A * | 3/2021 |
| DE | 102006061129 | A1 | 6/2008 |

* cited by examiner

SIMULATION DEVICE FOR MAGNETIC CLOSING OF FLAP VALVE

CROSS REFERENCE TO RELATED APPLICATION

This patent application is a continuation application of PCT/CN2021/106705, filed on Apr. 13, 2022, which claims the benefit and priority of Chinese Patent Application No. 202110351873.7, filed on Mar. 31, 2021, the disclosure of which is incorporated by reference herein in its entirety as part of the present application.

TECHNICAL FIELD

The present disclosure relates to the technical field of pressure maintaining coring experimental simulation device, and more specifically, to a simulation device for magnetic closing of flap valve.

BACKGROUND ART

During deep core sampling, in order to protect the obtained in-situ core under deep conditions, it is often necessary to use the in-situ fidelity coring device. After drilling the core with the drilling tool, the core is stored in the flap valve or pressure maintaining ball valve of the in-situ fidelity coring device. However, the existing in-situ fidelity coring device has obvious difference in pressure maintaining effect under different drilling environments. Taking the flap valve as an example, the closure of the flap valve mainly depends on elasticity and gravity. When the flap valve is in different inclined states, there are conditions that the flap valve can not be closed properly.

In order to develop a pressure maintaining coring device that can adapt to different drilling conditions, it is necessary to develop a simulation device that can simulate the closing process of flap valve under the action of magnetic force when drilling and coring in any direction in the deep. However, there is no relevant simulation device in the prior art.

Therefore, the existing technology needs to be further improved.

SUMMARY

In view of the shortcomings of the above prior art, the purpose of the disclosure is to provide a simulation device for magnetic closing of flap valve, which aims to simulate the closing process of the flap valve under the action of magnetic force under different drilling states.

The disclosure provides a simulation device for magnetic closing of flap valve, including a worktable, a magnetic pressure maintaining control mechanism and a magnetic valve cover closing control mechanism.

The worktable includes a driving mechanism for driving the worktable to rotate.

The magnetic pressure maintaining control mechanism includes a valve seat, a magnetic valve cover movably connected with one end of the valve seat, and a first magnet for repelling the magnetic valve cover. The valve seat and the first magnet are fixed on the worktable.

The magnetic valve cover closing control mechanism includes a cylinder and a lifting equipment for driving the cylinder to rise and fall. The lifting equipment is fixed on the worktable, and the lifting equipment is located on a same plane as the valve seat. When the cylinder is located in the valve seat, the magnetic valve cover is in an open state, and when the cylinder is separated from the magnetic valve cover, the magnetic valve cover is in a closed state.

Preferably, in the simulation device for magnetic closing of flap valve, the worktable further includes a first base and a second base rotatably connected with the first base. And the valve seat, the first magnet and the lifting equipment are fixed on the first base.

The driving mechanism includes a plane rotation driving mechanism and a vertical overturning driving mechanism. The plane rotation driving mechanism is used to drive the valve seat to rotate centered on a central axis of the valve seat. The vertical overturning driving mechanism is used to drive the valve seat to overturn around a plane of the first base.

Preferably, in the simulation device for magnetic closing of flap valve, the plane rotation driving mechanism includes a first gear, a second gear and a first power equipment. The first gear is meshed with the second gear, and the second gear is fixedly connected with an output end of the first power equipment. The first gear is fixed on an end face of the first base away from the valve seat, and the first power equipment is fixed on an end face of the second base away from the first base.

Preferably, in the simulation device for magnetic closing of flap valve, the vertical overturning driving mechanism includes a first transmission unit, a second transmission unit and a second power equipment for driving the first transmission unit and the second transmission unit. The first transmission unit and the second transmission unit are fixedly connected with the second base respectively, and the first transmission unit is connected with an output end of the second power equipment.

Preferably, the simulation device for magnetic closing of flap valve further includes a displacement adjustment mechanism for adjusting a distance between the first magnet and the valve seat. The displacement adjustment mechanism is fixed on the worktable. The displacement adjustment mechanism includes a pressure sensor for measuring a magnetic force between the magnetic valve cover and the first magnet, and the pressure sensor is connected with the first magnet.

Preferably, in the simulation device for magnetic closing of flap valve, the valve seat includes a cylinder body and a second magnet arranged inside the cylinder body, and the second magnet is used to attract the magnetic valve cover.

Preferably, in the simulation device for magnetic closing of flap valve, the valve seat further includes a bottom cover. The bottom cover is detachably connected with the cylinder body, and the bottom cover is provided with a hole for pressure test.

Preferably, in the simulation device for magnetic closing of flap valve, the magnetic valve cover includes a valve cover body, a connecting arm fixed on the valve cover body for movable connection with an open end of the valve seat, and a valve cover permanent magnet fixed on the valve cover body.

Preferably, in the simulation device for magnetic closing of flap valve, the bottom cover includes a bottom cover body for connecting a first step part of the cylinder body and a second step part distributed in steps with the first step part. And the second step part is arranged at an end of the first step part away from the cylinder body.

Preferably, the simulation device for magnetic closing of flap valve further includes an air supply mechanism connected with the hole through a pipe.

Beneficial effects: the embodiments of the disclosure provide a simulation device for magnetic closing of flap valve, including a worktable, a driving mechanism for driving the worktable to rotate, a valve seat fixed on the worktable, a magnetic valve cover movably connected with the valve seat, a first magnet for repelling the magnetic valve cover, a cylinder and a lifting equipment for driving the cylinder to rise and fall. When the cylinder is inserted into the valve seat driven by the lifting equipment, the cylinder prevents the closure of the magnetic valve cover. When the cylinder is out of contact with the magnetic valve cover driven by the lifting equipment, the magnetic valve cover is closed by the action of the magnetic force between the first magnet and the magnetic valve cover. Thus, the closing process of the deep drilling coring flap valve (valve seat and valve cover) under the action of magnetic force is simulated. At the same time, the driving mechanism drives the worktable to rotate and drives the flap valve to rotate, so that the flap valve is at different tilt angles. Therefore, the closing process of the deep drilling coring flap valve (valve seat and valve cover) under the action of magnetic force under different tilt states can also be simulated.

DETAILED DESCRIPTION OF THE EMBODIMENTS

The disclosure provides a simulation device for magnetic closing of flap valve. In order to make the purpose, technical scheme and effect of the disclosure clearer and more definite, the disclosure is further described in detail below. It should be understood that the specific embodiments described herein are only used to explain the disclosure and are not used to limit the disclosure. It can be understood by those skilled in the art that the singular forms "a", "one", "said" and "this" used herein may also include the plural forms unless specifically stated. It should be further understood that the term "including" used in the description of the present disclosure refers to the existence of the features, integers, steps, operations, elements and/or components, but does not exclude the existence or addition of one or more other features, integers, steps, operations, elements, components and/or groups thereof. It should be understood that when we call an element "connected" or "coupled" to another element, it can be directly connected or coupled to other elements, or there can be intermediate elements. In addition, the "connection" or "coupling" used herein may include wireless connection or wireless coupling. The term "and/or" as used herein includes all or any unit and all combinations of one or more associated listed items.

Unless otherwise defined, all technical and scientific terms used herein have the same meanings as those generally understood by those skilled in the technical field of the present disclosure. The terms used in the specification of the disclosure herein are only for the purpose of describing specific embodiments, and are not intended to limit the disclosure.

Figure 1:
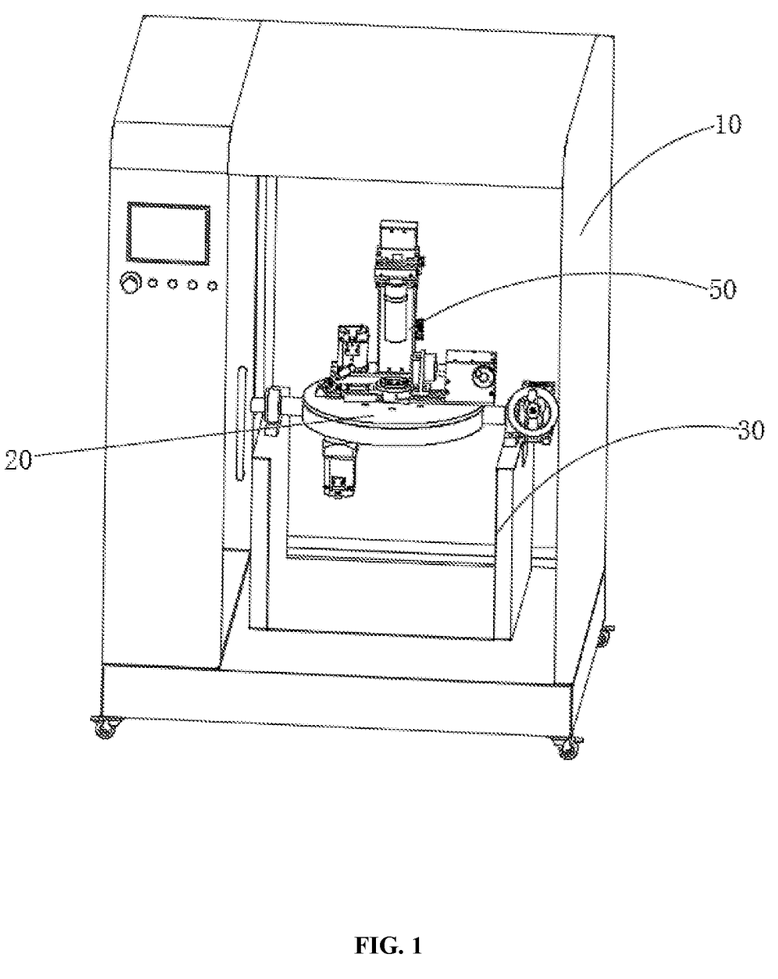
FIG. 1 is a stereogram of the simulation device for magnetic closing of flap valve provided by the embodiment of the disclosure.
Figure 2:
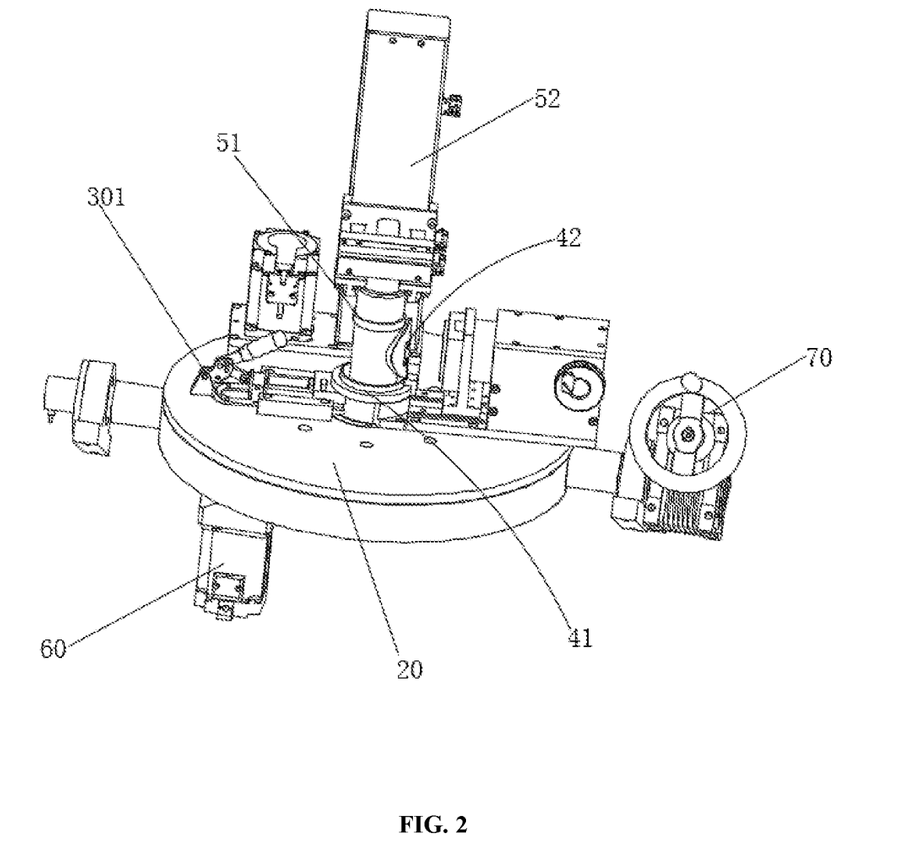
FIG. 2 is a partial structural diagram of the simulation device for magnetic closing of flap valve provided by the embodiment of the disclosure.
Figure 3:
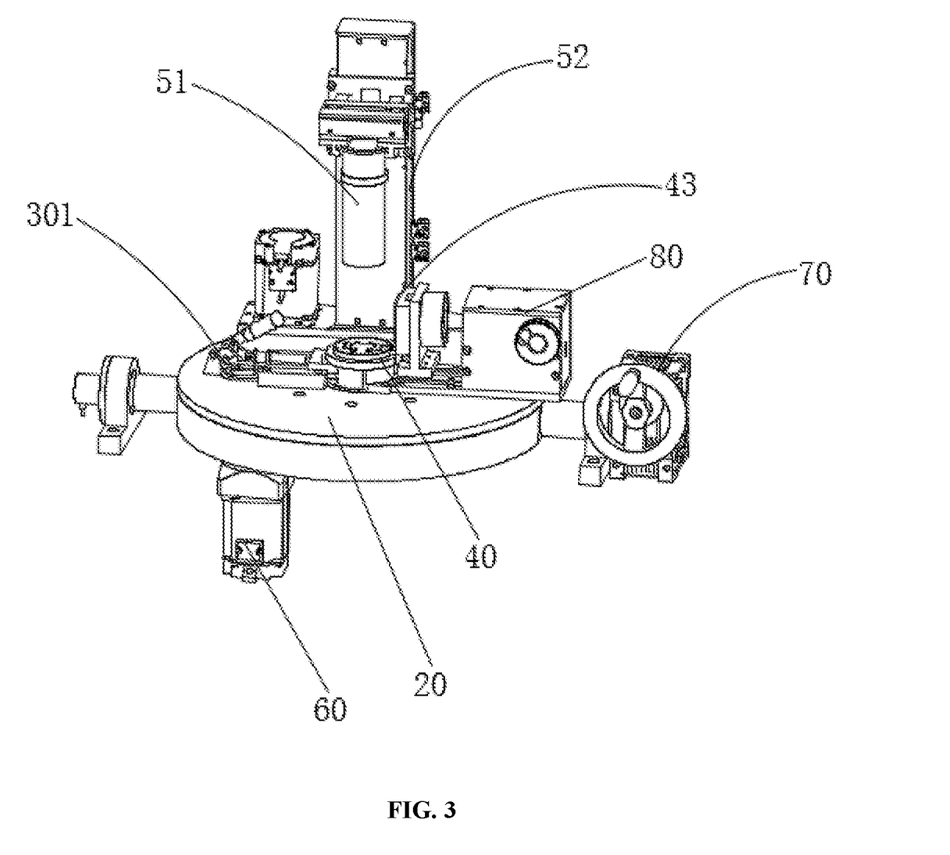
FIG. 3 is a partial structure diagram from another perspective of the simulation device for magnetic closing of flap valve provided by the embodiment of the disclosure.

As shown in FIG. 1 to FIG. 3, the embodiment of the disclosure provides a simulation device for magnetic closing of flap valve, which includes a shell body 10, a worktable 20 arranged inside the shell body 10, a support 30 for fixing the worktable 20, a magnetic pressure maintaining control mechanism 40 fixed on the surface of the worktable 20, a magnetic valve cover closing control mechanism 50, and a plane rotation driving mechanism 60 and vertical overturning driving mechanism 70 for driving the rotation of the worktable 20.

In the embodiment, the magnetic pressure maintaining control mechanism 40 includes a valve seat 41, a magnetic valve cover 42 movably connected with one end of the valve seat 41, and a first magnet 43 for repelling the magnetic valve cover 42. The valve seat 41 and the first magnet 43 are fixed on the worktable 20. The magnetic valve cover closing control mechanism 50 includes a cylinder 51 and a lifting equipment 52 for driving the cylinder 51 to rise and fall. The lifting equipment 52 is fixed on the worktable 20, and the lifting equipment 52 is located on a same plane as the valve seat 41. When the cylinder 51 is located in the valve seat 41, the magnetic valve cover 42 is in an open state, and when the cylinder 51 is separated from the magnetic valve cover 42, the magnetic valve cover 42 is in a closed state.

In the embodiment, the driving of the plane rotation driving mechanism 60 and the vertical overturning driving mechanism 70 can change the state of the worktable 20, so as to drive the state of the valve seat 41 arranged on the worktable 20 to change, and different states of the valve seat 41 can be simulated. Combined with the rise and fall of the cylinder 51, the closure between the valve seat 41 and the magnetic valve cover 42 under different states can be simulated.

In one implementation of the present embodiment, the worktable 20 includes a first base 21 and a second base 22. The shape of the first base 21 can be circular or other shapes. For example, in combination with FIG. 4, the shape of the first base 21 is circular, and the shape of the second base 22 is circular, which is adapted to the first base 21. A through hole 210 is arranged in the middle of the first base 21, the valve seat 41 passes through the through hole 210, and both ends of the valve seat 41 are exposed on both sides of the first base 21. One end of the valve seat 41 (connected with the magnetic valve cover) is fixed on the end surface of the first base 21 through a fixing member 220. The first magnet is directly opposite to the magnetic valve cover, that is, when the magnetic valve cover is opened, the first magnet is directly opposite to the magnetic valve cover. And setting the magnetic valve cover directly opposite to the first magnet can ensure that the magnetic valve cover will not be offset when it is closed under the action of magnetic force. The lifting equipment 52 is arranged on one side of the valve seat.

Figure 4:
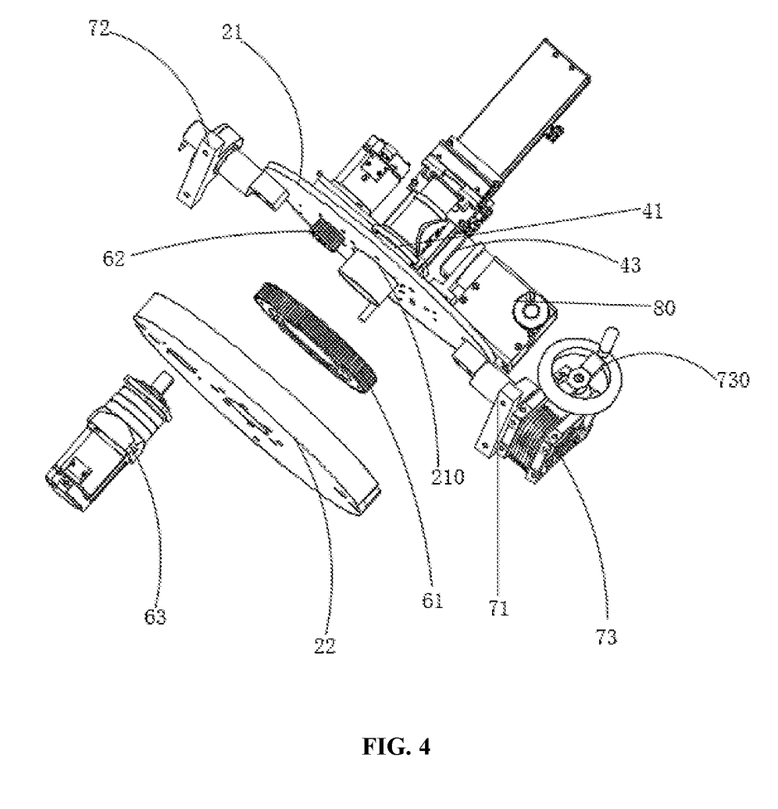
FIG. 4 is an exploded view of part of the structure of the simulation device for magnetic closing of flap valve provided by the embodiment of the present disclosure.

In this embodiment, the plane rotation driving mechanism 60 includes a first gear 61, a second gear 62 and a first power equipment 63. The power equipment can be a motor. The first gear 61 is meshed with the second gear 62, and the second gear 62 is fixedly connected with the output end of the first power equipment 63. The first gear 61 is fixed on the end face of the circular base 21 away from the valve seat 41

(that is, the first gear 61 and the valve seat 41 are respectively arranged on the two opposite end faces of the circular base 21). The second base 22 is provided with a hole for the output end of the motor to pass through. The first power equipment 63 is fixed on the second base 22, and its output end is close to the first gear 61, that is, the first gear 61 and the second gear 62 are arranged in the space formed between the first base 21 and the second base 22. The second gear is driven to rotate by the rotation of the motor. After the second gear is meshed with the first gear, the first base 21 is driven to rotate relative to the second base 22, that is, the plane rotation driving mechanism 60 can rotate the valve seat centered on its axis.

In this embodiment, the vertical overturning driving mechanism 70 includes a first transmission unit 71, a second transmission unit 72 and a second power equipment 73 for driving the first transmission unit 71 and the second transmission unit 72. The first transmission unit 71 and the second transmission unit 72 are fixedly connected with the second base 22 respectively, and the first transmission unit 71 is connected with an output end of the second power equipment 73. The first transmission unit 71 includes a bearing and a rotating shaft matched with the bearing. One end of the rotating shaft is matched with the bearing, and the other end is fixed on the second base 22. The second transmission unit 72 includes a bearing and a rotating shaft adapted to the bearing. One end of the rotating shaft is matched with the bearing, and the other end is fixed on the second base 22. The bearings are respectively fixed on the support 30. The second power equipment 73 can be an electric equipment or a manual equipment. For example, the second power equipment 73 is a manual equipment, including a hand wheel 730. The rotating the hand wheel 730 can turn the first base 21 and the second base 22 vertically. Through the cooperation of the plane rotation driving mechanism 60 and the vertical overturning driving mechanism 70, the situations of vertical drilling, horizontal drilling and inclined angle drilling can be simulated.

In one implementation of the present embodiment, the simulation device for magnetic closing of flap valve also includes a displacement adjustment mechanism 80 for adjusting the distance between the first magnet 43 and the valve seat 41. The displacement adjustment mechanism 80 includes a pressure sensor (not shown), which is connected with the first magnet. The magnetic force between the first magnet 43 and the magnetic valve cover 42 can be detected by the pressure sensor. The distance between the first magnet and the magnetic valve cover is adjusted by the magnetic force between the magnetic valve cover 42 and the first magnet 43 in different cases, and an appropriate distance is selected.

Figure 5:
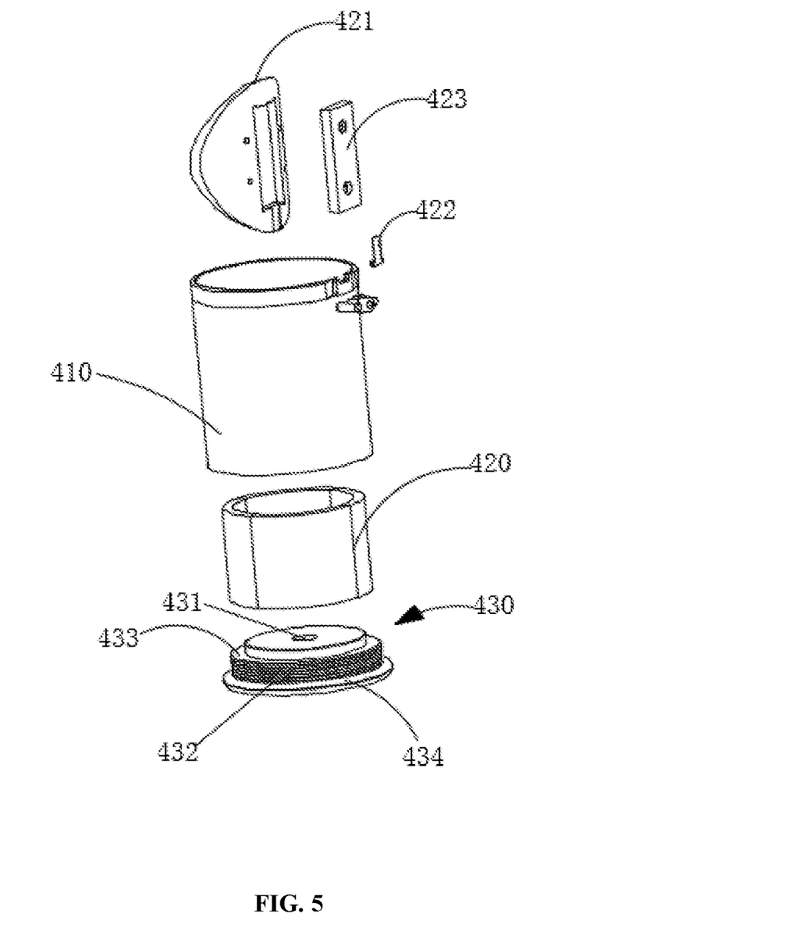
FIG. 5 is an exploded view of the valve cover and magnetic valve seat provided by the embodiment of the disclosure.

Referring to FIG. 5, in one implementation of this embodiment, the magnetic valve cover 42 includes a valve cover body 421, a connecting arm 422 fixed on the valve cover body 421 for movable connection with an open end of the valve seat 41, and a valve cover permanent magnet 423 fixed on the valve cover body. The connecting arm 422 can be an elastic sheet, one end of which is fixed on the valve cover body 421, and the other end is movably connected with one end of the valve seat.

In one implementation of this embodiment, the valve seat 41 includes a cylinder body 410 and a second magnet 420 arranged inside the cylinder body 410, and the second magnet 420 is used to attract the magnetic valve cover 42.

The cylinder body 410 is a cylindrical cylinder with openings at both ends, and the material of the cylinder body 410 can be metal, such as cast iron, steel, etc. The second magnet 420 is a cylindrical magnet, and the cylindrical magnet 420 can be formed by splicing at least two tile magnets along the circumferential direction. For example, four tile magnets (such as tile magnet 1, tile magnet 2, tile magnet 3 and tile magnet 4) are spliced along the circumferential direction. Wherein, the magnetization directions of the tile magnets can be the same or different, and the magnetization directions include axial magnetization direction and radial magnetization direction. For example, the magnetization direction of tile magnet 1, tile magnet 2, tile magnet 3 and tile magnet 4 is the axial direction.

In one implementation of this embodiment, the valve seat 41 also includes a bottom cover 430, which is detachably connected with the cylinder body 410, and the bottom cover 430 is provided with a hole 431 for pressure test.

In this embodiment, the bottom cover 430 refers to the other end (non-connecting end with the magnetic valve cover) used to block the cylindrical body 410. By setting the bottom cover 430 and the magnetic valve cover 42, the valve seat can be closed, that is, a closed space can be formed inside the valve seat.

In this embodiment, the bottom cover 430 includes a bottom cover body 432 for connecting the first step part 433 of the cylinder body and the second step part 434 distributed in steps with the first step part 433, and the second step part is arranged at an end of the first step part 433 away from the cylinder body 410. The outer surface of the first step part 433 is provided with an external thread, which can be connected with the cylinder body. It is easy to understand that the inner surface of the cylinder body is provided with an internal thread suitable for the external thread on the outer surface of the first step part 433. When the first step part 433 is connected with the thread on the cylinder body, the end of the cylindrical magnet 420 away from the magnetic valve cover is supported on the first step 433, and the second step part 434 is closely fitted with the end of the cylinder body, that is, the diameter of the second step part 434 is greater than the diameter of the first step part 433.

In this embodiment, the hole 431 for testing the sealing pressure arranged on the bottom cover 430 is located in the center of the bottom cover 430, and the hole 431 can be connected with the air supply mechanism (not shown in the figure) through a pipe to detect its sealing effect.

In summary, the embodiment of the disclosure provides a simulation device for magnetic closing of flap valve, including a worktable, a driving mechanism for driving the worktable to rotate, a valve seat fixed on the worktable, a magnetic valve cover movably connected with the valve seat, a first magnet for repelling the magnetic valve cover, a cylinder and a lifting equipment for driving the cylinder to rise and fall. When the cylinder is inserted into the valve seat driven by the lifting equipment, the cylinder prevents the closure of the magnetic valve cover. When the cylinder is out of contact with the magnetic valve cover driven by the lifting equipment, the magnetic valve cover is closed by the action of the magnetic force between the first magnet and the magnetic valve cover. Thus, the closing process of flap valve (valve seat and valve cover) in any direction of deep drilling coring under the action of magnetic force is simulated.

It should be understood that the application of the disclosure is not limited to the above examples. For those skilled in the art, it can be improved or transformed according to the above description. All these improvements and transformations should belong to the protection scope of the appended claims of the disclosure.

What is claimed is:

1. A simulation device for magnetic closing of flap valve, wherein the simulation device comprises:
    a worktable, comprising a driving mechanism for driving the worktable to rotate;
    a magnetic pressure maintaining control mechanism, comprising a valve seat, a magnetic valve cover movably connected with one end of the valve seat, and a first magnet for repelling the magnetic valve cover; wherein the valve seat and the first magnet are fixed on the worktable; and
    a magnetic valve cover closing control mechanism, comprising a cylinder and a lifting equipment for driving the cylinder to rise and fall; wherein the lifting equipment is fixed on the worktable, and the lifting equipment is located on a same plane as the valve seat; when the cylinder is located in the valve seat, the magnetic valve cover is in an open state, and when the cylinder is separated from the magnetic valve cover, the magnetic valve cover is in a closed state.

2. The simulation device for magnetic closing of flap valve of claim 1, wherein the worktable further comprises a first base and a second base rotatably connected with the first base; and the valve seat, the first magnet and the lifting equipment are fixed on the first base;
    the driving mechanism comprises a plane rotation driving mechanism and a vertical overturning driving mechanism; the plane rotation driving mechanism is used to drive the valve seat to rotate centered on a central axis of the valve seat; and the vertical overturning driving mechanism is used to drive the valve seat to overturn around a plane of the first base.

3. The simulation device for magnetic closing of flap valve of claim 2, wherein the plane rotation driving mechanism comprises a first gear, a second gear and a first power equipment; the first gear is meshed with the second gear, and the second gear is fixedly connected with an output end of the first power equipment; the first gear is fixed on an end face of the first base away from the valve seat, and the first power equipment is fixed on an end face of the second base away from the first base.

4. The simulation device for magnetic closing of flap valve of claim 2, wherein the vertical overturning driving mechanism comprises a first transmission unit, a second transmission unit and a second power equipment for driving the first transmission unit and the second transmission unit; the first transmission unit and the second transmission unit are fixedly connected with the second base respectively, and the first transmission unit is connected with an output end of the second power equipment.

5. The simulation device for magnetic closing of flap valve of claim 1, further comprising a displacement adjustment mechanism for adjusting a distance between the first magnet and the valve seat, wherein the displacement adjustment mechanism is fixed on the worktable; the displacement adjustment mechanism comprises a pressure sensor for measuring a magnetic force between the magnetic valve cover and the first magnet, and the pressure sensor is connected with the first magnet.

6. The simulation device for magnetic closing of flap valve of claim 1, wherein the valve seat comprises a cylinder body and a second magnet arranged inside the cylinder body, and the second magnet is used to attract the magnetic valve cover.

7. The simulation device for magnetic closing of flap valve of claim 6, wherein the valve seat further comprises a bottom cover, the bottom cover is detachably connected with the cylinder body, and the bottom cover is provided with a hole for pressure test.

8. The simulation device for magnetic closing of flap valve of claim 1, wherein the magnetic valve cover comprises a valve cover body, a connecting arm fixed on the valve cover body for movable connection with an open end of the valve seat, and a valve cover permanent magnet fixed on the valve cover body.

9. The simulation device for magnetic closing of flap valve of claim 7, wherein the bottom cover comprises a bottom cover body for connecting a first step part of the cylinder body and a second step part distributed in steps with the first step part, and the second step part is arranged at an end of the first step part away from the cylinder body.

10. The simulation device for magnetic closing of flap valve of claim 7, further comprising an air supply mechanism connected with the hole through a pipe.

* * * * *